(12) United States Patent
Kleinsasser

(10) Patent No.: US 11,284,601 B2
(45) Date of Patent: Mar. 29, 2022

(54) PIG FEEDER WITH EXTENDED HOPPER

(71) Applicant: Crystal Spring Colony Farms Ltd., Ste. Agathe (CA)

(72) Inventor: Jonathan Kleinsasser, Ste. Agathe (CA)

( * ) Notice: Subject to any disclaimer, the term of this patent is extended or adjusted under 35 U.S.C. 154(b) by 106 days.

(21) Appl. No.: 16/486,675

(22) PCT Filed: Jun. 1, 2018

(86) PCT No.: PCT/CA2018/050655
§ 371 (c)(1),
(2) Date: Aug. 16, 2019

(87) PCT Pub. No.: WO2018/223223
PCT Pub. Date: Dec. 13, 2018

(65) Prior Publication Data
US 2020/0008393 A1   Jan. 9, 2020

Related U.S. Application Data

(60) Provisional application No. 62/516,467, filed on Jun. 7, 2017.

(51) Int. Cl.
*A01K 5/02* (2006.01)
*A01K 5/01* (2006.01)

(52) U.S. Cl.
CPC ............. *A01K 5/0225* (2013.01); *A01K 5/01* (2013.01); *A01K 5/0216* (2013.01)

(58) Field of Classification Search
CPC ...... A01K 5/0225; A01K 5/01; A01K 5/0216; A01K 5/0233
See application file for complete search history.

(56) References Cited

U.S. PATENT DOCUMENTS

| | | | | |
|---|---|---|---|---|
| 961,779 A | * | 6/1910 | Kellum | A01K 5/0241 119/54 |
| 1,390,209 A | * | 9/1921 | McArthur | A01K 5/0233 119/53.5 |
| 1,399,716 A | * | 12/1921 | Riner | A01K 5/0241 119/53.5 |
| 1,695,597 A | * | 12/1928 | Lydon | A01K 5/0241 119/54 |
| 2,056,814 A | * | 10/1936 | Winn | A01K 31/18 119/302 |
| 4,660,508 A | * | 4/1987 | Kleinsasser | A01K 5/0225 119/51.5 |

(Continued)

*Primary Examiner* — Ebony E Evans
(74) *Attorney, Agent, or Firm* — Adrian D. Battison; Ade & Company Inc.; Ryan W. Dupuis

(57) ABSTRACT

A feeder unit for pigs has an elongate trough with a hopper mounted over the trough for depositing feed downwardly and a feed dispensing control system at a bottom of the hopper so as to supply feed downwardly to make up feed taken by the pigs. The hopper includes four upstanding side walls forming an elongate rectangular open top edge with an open upper guide mouth located centrally above the top edge for locating a downspout of a feed supply system. The open top is covered by two inclined walls each extending upwardly from a long top edge of a respective one of the side walls and inwardly of the side wall of the hopper toward the open upper guide mouth and by two hinged dust covers extending from the short edges to the mouth.

24 Claims, 3 Drawing Sheets

(56) References Cited

U.S. PATENT DOCUMENTS

| | | | | |
|---|---|---|---|---|
| 7,891,317 B2* | 2/2011 | Bodenstab | ............ | A01K 5/0225 |
| | | | | 119/53 |
| 2017/0000083 A1* | 1/2017 | McAdams | .......... | F16K 31/1266 |

* cited by examiner

PIG FEEDER WITH EXTENDED HOPPER

This invention relates to a feeder for pigs which includes at least one inclined wall forming an upper extension to the hopper.

BACKGROUND OF THE INVENTION

Various arrangements of animal feeder are provided in which there is a trough into which feed can be deposited from a hopper above the trough. In most cases the feed material to be deposited can vary in particle size and viscosity so that it is often desirable to provide an arrangement which allows an adjustment of the opening through which the material can feed from the hopper into the trough.

In many cases the opening is provided by a simple shutter at the gap between the hopper and the trough where the height of the shutter can be adjusted to vary the gap at the bottom of the shutter.

In U.S. Pat. No. 4,660,508 (Kleinsasser) issued Apr. 28, 1987 is disclosed a feeder which provides a shelf above the trough with the hopper discharging onto the shelf in a manner so that the feed remains on the shelf but can be moved from the shelf to the trough by the animal as required. Feeders of this type have achieved significant commercial success. Adjustment of the height of the shelf is necessary for the purpose of accommodating different types of feed and different feed rates and this is obtained by a hand crank screw which operates with a threaded nut to raise and lower a strap carrying the shelf. The screw is used in adjustment of this device because the deposit of the feed onto the self requires an accurate adjustment of the distance between the shelf and the bottom edge of the hopper so that cruder systems with a less fine adjustment have been rejected.

In U.S. Pat. No. 5,603,285 issued Feb. 18, 1997 and U.S. Pat. No. 5,967,083 issued Oct. 19, 1999 both by Kleinsasser of the present assignees there is shown a similar arrangement which includes a hopper above a shelf onto which feed can fall to be taken by the pig or dropped into a trough below the shelf. The height of the shelf is adjustable to change the width of the opening through which the feed passes to control feed rate. The shelf is carried on straps which extend along the end walls of the hopper and are movable by an adjustment linkage which allows the shelf to be adjusted in height for use with both weanling pigs and finisher pigs up to market weight.

The disclosures of the above patents are incorporated herein by reference or may be reviewed for further details not set out herein.

While the feeder herein preferably is of the type described above including a shelf and water supply under the shelf, commonly known as a wet/dry feeder, the cover system described herein can be also used with other types of feeder such as a dry feeder.

SUMMARY OF THE INVENTION

According to one aspect of the invention there is provided a feeder unit for pigs comprising an elongate trough having a base and a sidewall for receiving and containing feed and arranged such that the head of the animal can reach over an upper front edge of the sidewall to the base for eating the feed, a hopper mounted over the trough for depositing feed downwardly;

a feed dispensing control system at a bottom of the hopper so as to supply feed downwardly to make up feed taken by the pigs;

said hopper including four upstanding side walls connected side edge to side edge to form a container for the feed material having a rectangular open top edge;

an open upper guide mouth above the top edge for locating a downspout of a feed supply system through which feed is supplied to the hopper;

said hopper including two opposed planar inclined walls each extending along a top edge of a respective one of the side walls and extending upwardly and inwardly of the side wall of the hopper to a position at the open upper guide mouth;

each inclined wall having a lower horizontal edge equal in length to the top edge of the respective side wall and an upper horizontal edge at the guide mouth.

According to a second aspect of the invention there is provided a feeder unit for pigs comprising an elongate trough having a base and a sidewall for receiving and containing feed and arranged such that the head of the animal can reach over an upper front edge of the sidewall to the base for eating the feed, a hopper mounted over the trough for depositing feed downwardly;

a feed dispensing control system at a bottom of the hopper so as to supply feed downwardly to make up feed taken by the pigs;

said hopper including four upstanding side walls connected side edge to side edge to form a container for the feed material having a rectangular open top edge;

an open upper guide mouth above the top edge for locating a downspout of a feed supply system through which feed is supplied to the hopper;

said hopper including two opposed inclined walls each extending along a top edge of a respective one of the side walls and extending upwardly and inwardly of the side wall of the hopper to a position at the open upper guide mouth;

wherein the hopper is elongate with two long top edges and two short top edges;

wherein said two inclined walls each extend upwardly from a respective long top edge;

and wherein there is provided two openable cover plates each of which extends from a position at the guide mouth to a respective one of the short top edges.

According to a further aspect of the invention there is provided a feeder unit for pigs comprising an elongate trough having a base and a sidewall for receiving and containing feed and arranged such that the head of the animal can reach over an upper front edge of the sidewall to the base for eating the feed, a hopper mounted over the trough for depositing feed downwardly;

a feed dispensing control system at a bottom of the hopper so as to supply feed downwardly to make up feed taken by the pigs;

said hopper including four upstanding side walls connected side edge to side edge to form a container for the feed material having a rectangular open top edge;

an open upper guide mouth above the top edge for locating a downspout of a feed supply system through which feed is supplied to the hopper;

said hopper including two opposed inclined walls each extending along a top edge of a respective one of the side walls and extending upwardly and inwardly of the side wall of the hopper to a position at the open upper guide mouth;

wherein the hopper is elongate with two long top edges and two short top edges;

and wherein the height of the guide mouth from the top edge and the spacing of the guide mouth from the short top edge is arranged such that when filled to the guide mouth the natural repose angle of the feed prevents escape of the feed over an open top of the short top edges.

Preferably the guide mouth comprises a ring into which the downspout can be inserted which can be formed by a hole in a horizontal rectangular plate with the inclined wall attached to one side edge of the plate.

While the feeder may be a one sided system allowing feeding only from one side, more preferably the hopper is two sided so that it is elongate with two long top edges at the sides of the feeder where the animals access the feed and two short top edges and there are provided two inclined walls each extending upwardly from a respective long top edge to a position closely adjacent the guide mouth.

Preferably the two short top edges are open or at least openable so that there is no fixed inclined wall at the short top edge. In this case when filled to the guide mouth the natural repose angle of the feed prevents escape of the feed over the open top of the short top edges.

Preferably the inclined wall is fixed so that it is attached at the bottom to the top edge of the hopper and at the top to the guide mouth.

One advantage of this system is that the guide mouth is located at a height greater than that typically provided and above that which can be accessed by the pigs. In this way the pigs are prevented from interfering with the supply or damaging the downspout.

In some cases the inclined wall can includes at least one opening and typically two openings separate from the guide mouth through which a second downspout can be inserted. This can be a permanent opening but more preferably is formed as a knock out blank to allow the opening to be formed and used only when required depending on the downspout configuration which can be a single spout or in some cases a Y-shaped configuration.

In some cases there can be provided at least one hinged or removable cover plate or dust plate covering parts of the top which are not covered by the inclined walls. The hinged cover plate is preferably movable by a worker for inspecting feed inside the hopper and for actuating an adjustment mechanism located inside the hopper.

Where the hopper is elongate with two long top edges and two short top edges and there are two inclined walls, preferably there are provided two hinged or removable cover plates each of which extends from a short top edge to the guide mouth.

Preferably the hinged cover plates are hinged at the top adjacent the guide mouth and may also be hinged across a center line so as to allow a folding action causing movement of a bottom edge of the hinged cover plate inwardly. Preferably the hinged cover plates are arranged to be latched at a raised open position.

Preferably the hinged or movable cover plates include downturned side edges which extend over a side edge of the inclined walls to prevent penetration of water between the edge of the cover plate and the edge of the inclined wall.

Preferably the hinged cover plates include a top flange portion which extends over a horizontal top plate containing the open mouth to prevent penetration of water between the flange portion of the cover plate and horizontal top plate.

Preferably the system is used with a feeder of the type where the feed dispensing control system comprises an elongate shelf which extends substantially along a full length of the trough and provides a substantially horizontal surface for receiving feed, said horizontal surface of said shelf being arranged at a height above and rearwardly of said front edge and separate from said trough such that any feed falling therefrom along the full length thereof can fall directly vertically downwardly into the trough and so as to allow access by the head of the animal to said shelf for direct feeding therefrom, and between said shelf and said front edge to said base. In this case there may be provided a water supply underneath the shelf operable by the pigs.

The arrangement as described herein provides an extension to the feed hopper that has several features as follows:

1. Added feed capacity;
2. improved feed distribution when only one feed drop is used;
3. On longer feeders where a Y fitting is used to spread the feed, with mash feed or very cold temperature outside, feed from an outside bin entering the Y can plug. Typically this requires the operator to tap it to start the flow or the pigs run out of feed. However the arrangement herein where the feed is more protected can avoid such a blockage;
4. the inclined walls provide a dust cover over parts of the top while other parts are still open so the operator can look in to see if there is feed. Even where separate dust covers are also provided, these are hinged or removable to provide vision.
5. the downspout is now supported at a raised position out of the pigs reach so they cannot remove or destroy the feed system.

Preferably the wall is inclined upwardly and inwardly of the top edge of the hopper. However one part or parts of the wall may be vertical.

Preferably the hopper is rectangular with a rectangular top edge. However other shapes are possible and the feeder may be circular. Typically the feeder is two sided so that the pigs can access the feeder from two sides. However single sided feeders are included.

Preferably although not essentially the mouth is located centrally of the top edge of the hopper.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
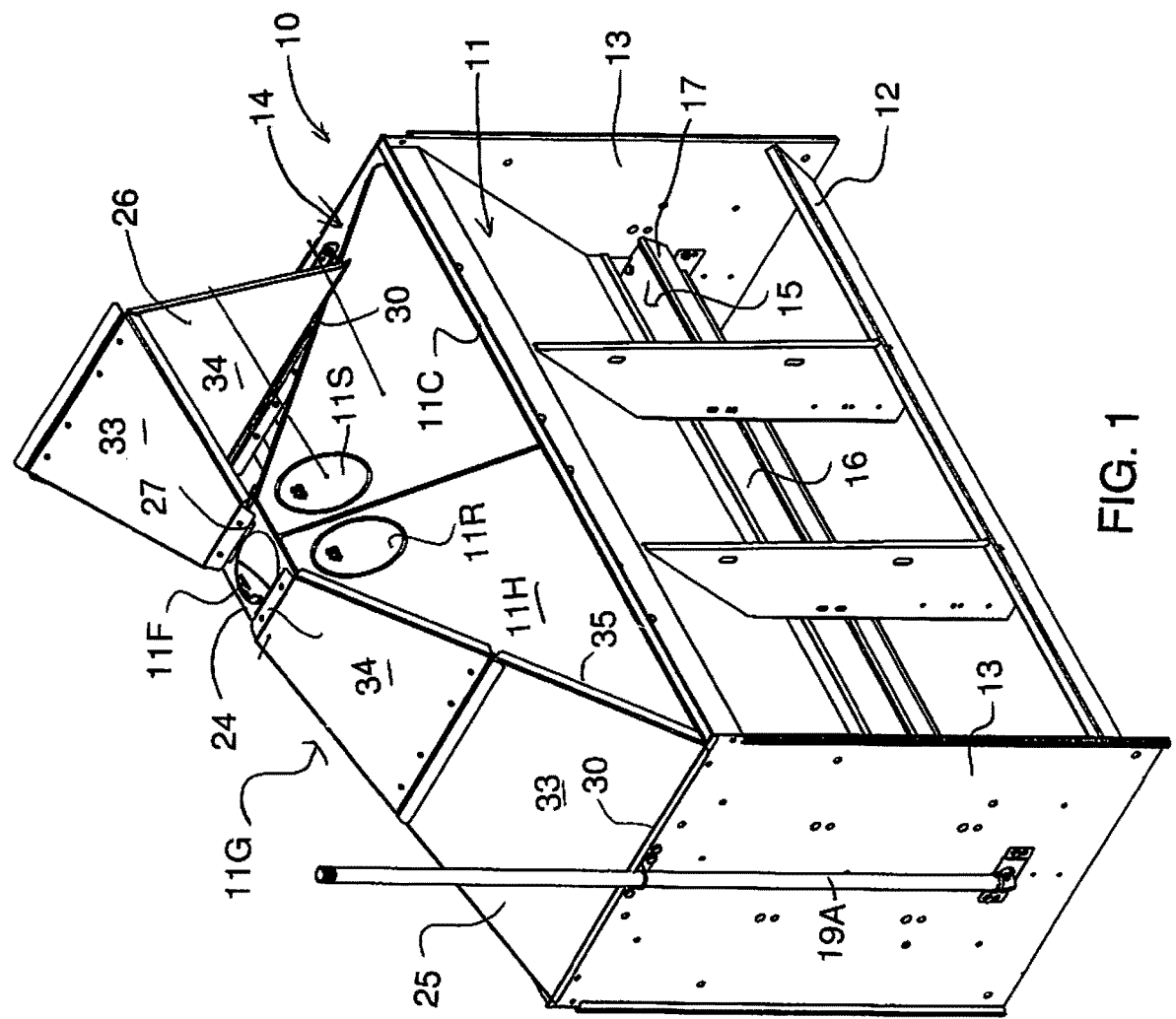
FIG. 1 is an isometric view of a feeder according to the present invention showing the extension section at the top of the hopper.
Figure 2:
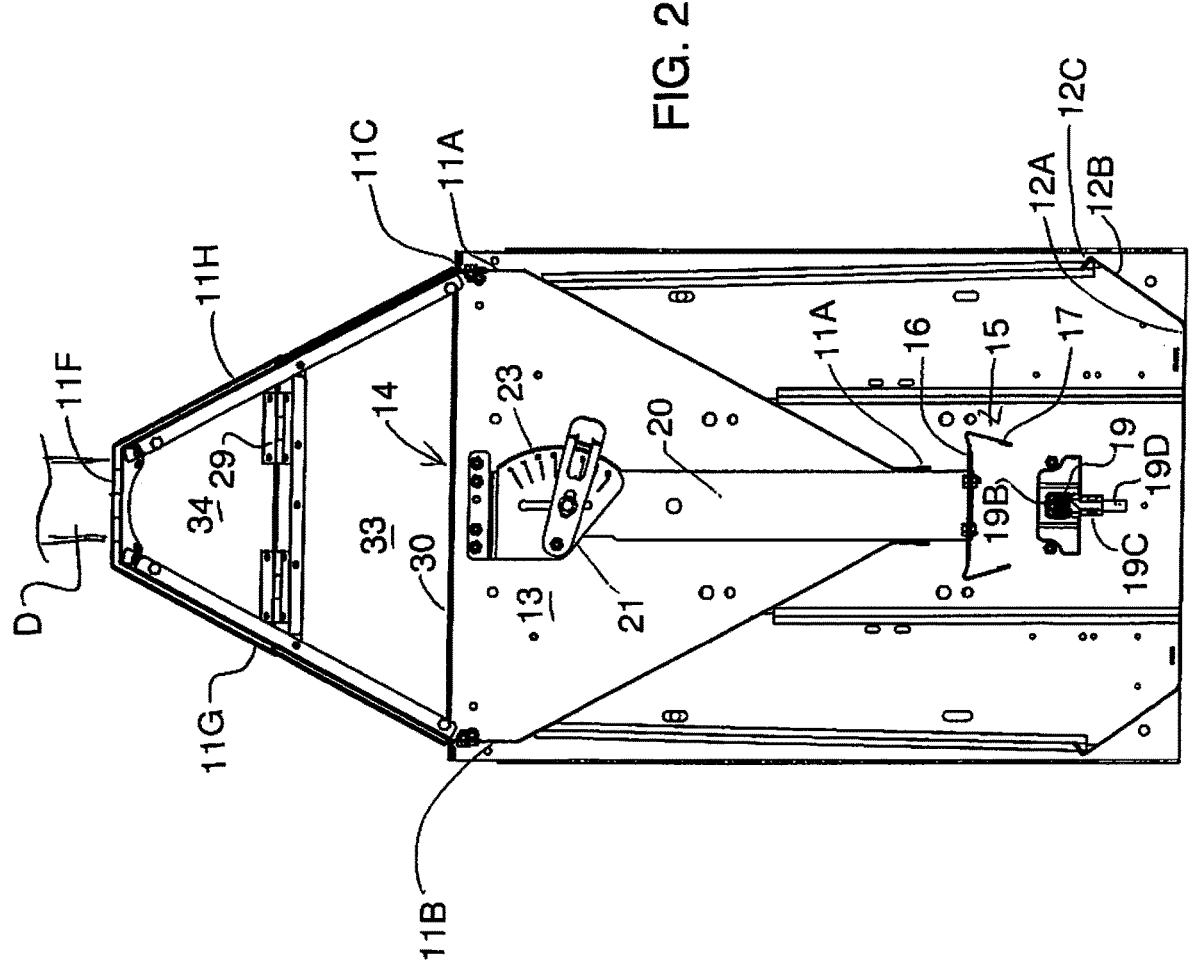
FIG. 2 is a transverse cross-sectional view of the feeder of FIG. 1.
Figure 3:
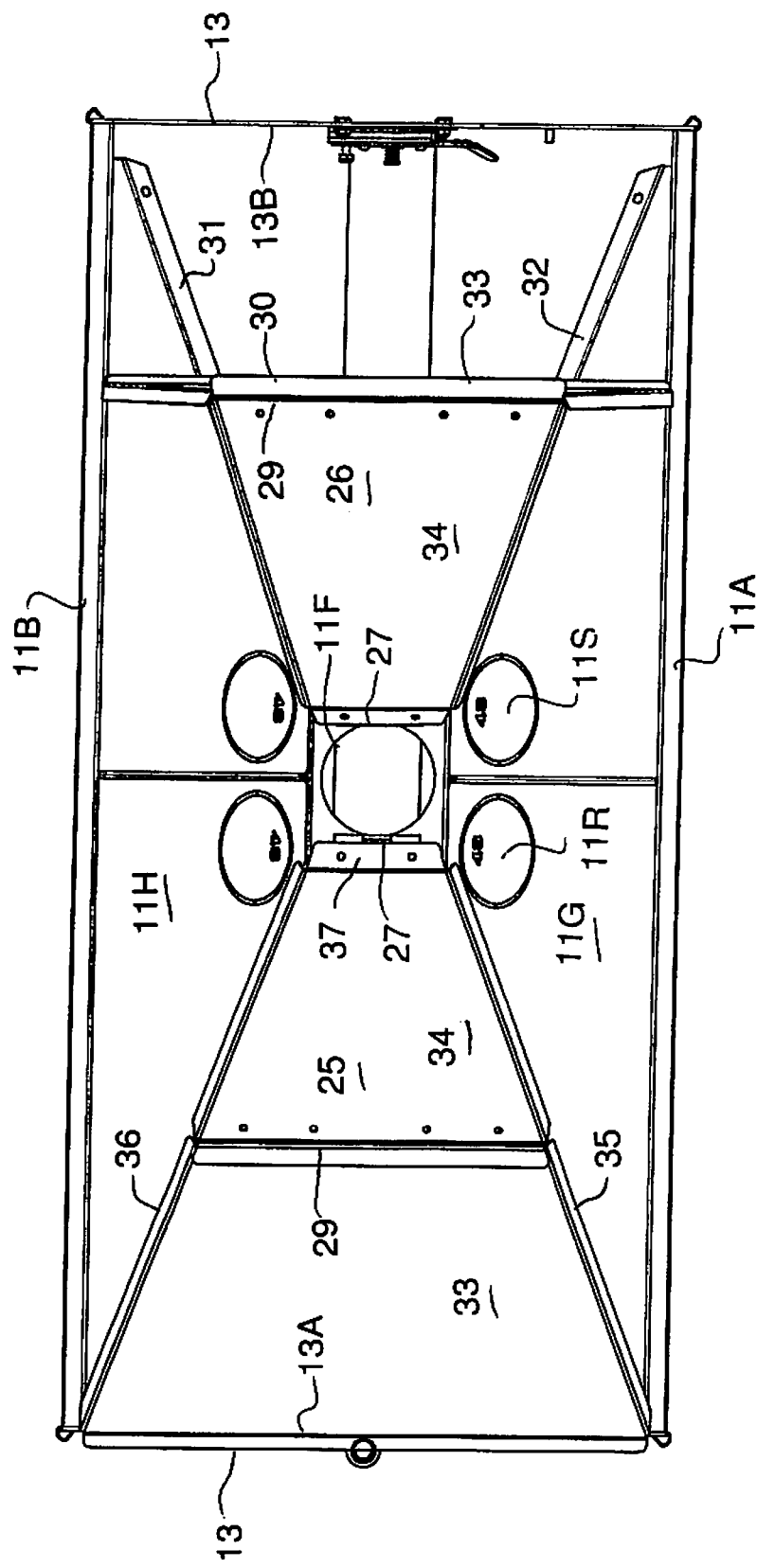
FIG. 3 is a top plan view of the feeder of FIG. 1.

The feeder shown herein is similar in construction to that shown in the above patents of the present inventor, to which reference may be made for further detail.

A feeder is generally indicated at 10 and includes a hopper 11 and a trough 12. The trough is connect to the hopper by end walls 13 so as to form an integral structure with generally open top 14 through which feed can be inserted for containing in the hopper and for discharge into the trough 12 for feeding by one or more pigs. In the embodiment shown there is provided a shelf 15 with a generally horizontal surface 16 and a downturned edge 17.

A water supply 19 into the trough can be provided which includes an upstanding feeder pipe 19A, a pipe 19B along the trough and a plurality of downwardly extending nipples 19C with a The shape and arrangement of the hopper and trough can be varied and can provide either a two sided structure as shown or a single sided structure.

The height of the shelf relative to the end wall of the hopper is adjusted by raising straps 20 where each strap is arranged at a respective end of the shelf and lies along the end wall 13 parallel to the end wall. The strap is raised and lowered by a lever 21 which can be connected to a support 23.

The elongate trough 12 has a flat horizontal base 12A and a sidewall 12B for receiving and containing feed and arranged such that the head of the pig can reach over a top edge 12C of the sidewall to the base 12A for eating the feed.

The elongate shelf 15 extends substantially along a full length of the trough and provides a substantially horizontal surface 16 for receiving feed. The horizontal surface of the shelf is arranged rearwardly of the top edge 12C and separate from the trough such that any feed falling therefrom along the full length thereof can fall directly vertically downwardly into the trough and so as to allow access by the head of the pig to the shelf for direct feeding therefrom, and between the shelf and the top edge to the base. The hopper 11 has an elongate lowermost edge 11A mounted and arranged such that the lowermost edge extends substantially wholly along, adjacent to and spaced from said horizontal surface by a vertical distance and spaced from a front edge 17 of the shelf by a horizontal distance such that the angle of repose of the feed from the lowermost edge to said shelf prevents the feed from falling over the front edge of the shelf and thus automatically controls deposit of further feed onto the shelf.

The water pipe 19B is located underneath the shelf along the shelf with a plurality of water dispensing nipples 19C mounted on the pipe at spaced positions along the pipe and extending from the pipe downwardly toward the base of the trough, the nipples being operable by the pigs to dispense water downwardly into the trough for mixing with any feed in the trough. The shelf is adjustable in relation to the edge 11A to control feed flow.

The hopper 11 includes upstanding side walls 11A, 11B and end walls 13 connected side edge to side edge to form a rectangular container for the feed material and extending upwardly to a rectangular top edge 11C of the side walls. The open top 14 receives feed from a single open upper mouth 11F defined by a band around an opening centrally of the feeder above the top edge 11C of the side walls into which feed is supplied by a downspout D of a feed supply system (not shown but conventional). The mouth is located at a height above the top edge 11C which cannot be accessed by the pigs to prevent their access for damaging the feed system.

The hopper includes two inclined walls 11G and 11H extending upwardly from the top edge 11O and inwardly of the hopper toward the open upper mouth 11F.

The fixed inclined walls 11G and 11H are fixed to the top edge flanges of the walls 11A and 11B and are inclined upwardly and inwardly of the top edge 11O of the hopper each extending upwardly from a respective long top edge at the sides 11A and 11B to the mouth 11F. The mouth 11F is preferably formed as a hole in a rectangular plate with the edges of the plate fastened to a horizontal top edge of the inclined walls.

Thus the inclined walls 11G and 11H are generally triangular so that the upper edge is equal in width to the top plate 24 and the bottom edge is equal in width to the top edge 11C. Each of the inclined walls is planar.

The two short top edges at the ends 13 are basically open so that there is no fixed inclined wall at all at the ends so that this area is open or can be opened. The natural repose angle of the feed, which rests against the inclined walls 11G and 11H, prevents escape through the opening above the top of the end walls 13 since the feed rests against the walls 13 and the distance of the ends 13 from the mouth ensures that the feed does not escape over the top 13A, 13B through the open end. That is the feed entering at the center lies preferentially against the long side walls 11A and 11B and only reaches the ends 13 at a lower height due to its repose angle so that the feed can be introduced into the hopper to a height above the top edge 11C at the long sides and basically up to the mouth 11F where a feed switch can be provided to halt flow after the mouth is reached.

The inclined walls 11G and 11H each include at least one opening 11R, 11S separate from the guide mouth at the plate 24 through which a second and third downspout can be inserted. These are provided close to the top of the wall adjacent the plate 24. the openings can be formed as scored or perforated blanks which can remain in place to keep the walls 11G and 11H sealed if not required or can be knocked out by the worker if the configuration of feed downspouts requires this.

In some embodiments the triangular spaces between the end walls 13 and the plate 24 remain open to allow vision through the opening of the feed in the hopper. However, as an option, there can be provided a pair of hinged cover plates 25 and 26 acting as a dust cover covering the parts of the top which are not covered by the inclined walls.

The hinged cover plates 25 and 26 are hinged at upper horizontal hinges 27 at the respective edge of the plate 24 so that each cover plate is liftable by a worker for inspecting feed inside the hopper and for accessing the adjustment lever 21. The hinged cover plates 25, 26 are also hinged across a transverse hinge line 29 across the center dividing each cover panel into upper and lower portions 33, 34, This acts to allow a folding action shown at cover panel 26 where a bottom edge 30 of the lower portion of the cover panel 26 sits on the side edges of the inclined walls and thus is latched in place. The inclined walls 11G and 11H each have an in-turned top edge flange 31, 32 extending along the respective side edges.

The hinged cover plates 25 and 26 include downturned side edge flanges 35, 36 which extend over a side edge of the inclined walls 11G, 11H to prevent penetration of washing or cooling water between the edge of the cover plate and the edge of the inclined wall.

The hinged cover plates include a top flange portion 37 at the hinge 27 which extends over the horizontal top plate 24 containing the open mouth to prevent penetration of the water between the flange portion 37 of the cover plate and horizontal top plate.

Thus when cooling water is dispensed in the area of the feeder over the pigs the covers prevent water entering the hopper.

The invention claimed is:
1. A feeder unit for pigs comprising
an elongate trough having a base and a sidewall for receiving and containing feed and arranged such that the head of the animal can reach over an upper front edge of the sidewall to the base for eating the feed, a hopper mounted over the trough for depositing feed downwardly;

a feed dispensing control system at a bottom of the hopper so as to supply feed downwardly to make up feed taken by the pigs;

said hopper including four upstanding side walls connected side edge to side edge to form a container for the feed material;

an open upper guide mouth for locating a downspout of a feed supply system through which feed is supplied to the hopper;

wherein the hopper is elongate with two long top edges and two short top edges;

said hopper including two opposed inclined walls each extending along a respective one of the two long top edges and extending upwardly and inwardly of the side wall of the hopper to a position at the open upper guide mouth;

and wherein an area between each of the two short top edges and the open upper guide mouth is open or openable to define an opening therein.

2. The feeder unit according to claim 1 wherein a height of the open upper guide mouth from the long top edges and the spacing of the guide mouth from the short top edges is arranged such that, when filled to the open upper guide mouth, the feed has a natural repose angle which prevents escape of the feed through the opening at the short top edges.

3. The feeder unit according to claim 1 wherein at least one of said inclined walls includes at least one location at which said at least one of said inclined walls can be opened to define an opening separate from the guide mouth through which a second downspout is inserted.

4. The feeder unit according to claim 3 wherein said inclined wall includes two side by side openings separate from the open upper guide mouth through which two side by side downspouts can be inserted.

5. The feeder unit according to claim 1 including two openable cover plates each of which extends from a position at the open upper guide mouth to a respective one of the short top edges.

6. The feeder unit according to claim 5 wherein said openable cover plates are movable by a worker for inspecting feed inside the hopper and for accessing an adjustment mechanism inside at least one of the short sides.

7. The feeder unit according to claim 5 wherein the openable cover plates are hinged at or adjacent the open upper guide mouth.

8. The feeder unit according to claim 7 wherein the openable cover plates are hinged across a transverse line so as to fold inwardly and allow movement of a bottom edge of each of the openable cover plate inwardly.

9. The feeder unit according to claim 8 wherein the openable cover plates are arranged to be latched at a raised open position.

10. The feeder unit according to claim 1 wherein the feed dispensing control system comprises an elongate shelf which extends substantially along a full length of the trough and provides a substantially horizontal surface for receiving feed, said horizontal surface of said shelf being arranged at a height above and rearwardly of said front edge and separate from said trough such that any feed falling therefrom along the full length thereof can fall directly vertically downwardly into the trough and so as to allow access by the head of the animal to said shelf for direct feeding therefrom, and between said shelf and said front edge to said base.

11. A feeder unit for pigs comprising an elongate trough having a base and a sidewall for receiving and containing feed and arranged such that the head of the animal can reach over an upper front edge of the sidewall to the base for eating the feed, a hopper mounted over the trough for depositing feed downwardly;

a feed dispensing control system at a bottom of the hopper so as to supply feed downwardly to make up feed taken by the pigs;

said hopper including four upstanding side walls connected side edge to side edge to form a container for the feed material;

an open upper guide mouth for locating a downspout of a feed supply system through which feed is supplied to the hopper;

wherein the hopper is elongate with two long top edges and two short top edges;

said hopper including two opposed inclined walls each extending along a respective one of the two long top edges and extending upwardly and inwardly of the side wall of the hopper to a position at the open upper guide mouth;

wherein an area between each of the two short top edges and the open upper guide mouth includes an opening therein;

and wherein there are provided two openable cover plates each of which extends from a respective one of the short top edges upwardly toward the open upper guide mouth and is openable to expose an opening in the respective one of the short top edges.

12. The feeder unit according to claim 11 wherein at least one of said inclined walls includes at least one opening separate from the guide mouth through which a second downspout is inserted.

13. The feeder unit according to claim 12 wherein said inclined wall includes two side by side openings separate from the open upper guide mouth through which two side by side downspouts can be inserted.

14. The feeder unit according to claim 11 wherein said openable cover plates are movable by a worker for inspecting feed inside the hopper and for accessing an adjustment mechanism inside at least one of the short sides.

15. The feeder unit according to claim 11 wherein the feed dispensing control system comprises an elongate shelf which extends substantially along a full length of the trough and provides a substantially horizontal surface for receiving feed, said horizontal surface of said shelf being arranged at a height above and rearwardly of said front edge and separate from said trough such that any feed falling therefrom along the full length thereof can fall directly vertically downwardly into the trough and so as to allow access by the head of the animal to said shelf for direct feeding therefrom, and between said shelf and said front edge to said base.

16. A feeder unit for pigs comprising an elongate trough having a base and a sidewall for receiving and containing feed and arranged such that the head of the animal can reach over an upper front edge of the sidewall to the base for eating the feed, a hopper mounted over the trough for depositing feed downwardly;

a feed dispensing control system at a bottom of the hopper so as to supply feed downwardly to make up feed taken by the pigs;

said hopper including four upstanding side walls connected side edge to side edge to form a container for the feed material;

an open upper guide mouth for locating a downspout of a feed supply system through which feed is supplied to the hopper;

wherein the hopper is elongate with two long top edges and two short top edges;

said hopper including two opposed inclined walls each extending along a respective one of the two long top edges and extending upwardly and inwardly of the side wall of the hopper to a position at the open upper guide mouth;

wherein an area between each of the two short top edges and the open upper guide mouth includes an opening therein;

and wherein there are provided two openable cover plates each of which extends from a respective one of the short top edges upwardly toward the open upper guide mouth and is openable to expose an opening in the respective one of the short top edges;

wherein the openable cover plates are hinged across a transverse line at or adjacent the open upper guide mouth;

and wherein the openable cover plates are hinged across a line parallel to said transverse line so as to fold inwardly and allow movement of a bottom edge of each of the openable cover plate upwardly and inwardly.

17. The feeder unit according to claim 16 wherein at least one of said inclined walls includes at least one opening separate from the guide mouth through which a second downspout is inserted.

18. The feeder unit according to claim 17 wherein said inclined wall includes two side by side openings separate from the open upper guide mouth through which two side by side downspouts can be inserted.

19. The feeder unit according to claim 16 wherein said openable cover plates are movable by a worker for inspecting feed inside the hopper and for accessing an adjustment mechanism inside at least one of the short sides.

20. The feeder unit according to claim 16 wherein the feed dispensing control system comprises an elongate shelf which extends substantially along a full length of the trough and provides a substantially horizontal surface for receiving feed, said horizontal surface of said shelf being arranged at a height above and rearwardly of said front edge and separate from said trough such that any feed falling therefrom along the full length thereof can fall directly vertically downwardly into the trough and so as to allow access by the head of the animal to said shelf for direct feeding therefrom, and between said shelf and said front edge to said base.

21. A feeder unit for pigs comprising
an elongate trough having a base and a sidewall for receiving and containing feed and arranged such that the head of the animal can reach over an upper front edge of the sidewall to the base for eating the feed, a hopper mounted over the trough for depositing feed downwardly;

a feed dispensing control system at a bottom of the hopper so as to supply feed downwardly to make up feed taken by the pigs;

said hopper including four upstanding side walls connected side edge to side edge to form a container for the feed material;

an open upper guide mouth for locating a downspout of a feed supply system through which feed is supplied to the hopper;

wherein the hopper is elongate with two long top edges and two short top edges;

said hopper including two opposed inclined walls each extending along a respective one of the two long top edges and extending upwardly and inwardly of the side wall of the hopper to a position at the open upper guide mouth;

wherein an area between each of the two short top edges and the open upper guide mouth includes an opening therein;

and wherein a height of the open upper guide mouth from the short top edges edge is arranged such that, when filled to the open upper guide mouth, the feed has a natural repose angle which prevents escape of the feed through the opening.

22. The feeder unit according to claim 21 wherein at least one of said inclined walls includes at least one opening separate from the guide mouth through which a second downspout is inserted.

23. The feeder unit according to claim 22 wherein said inclined wall includes two side by side openings separate from the open upper guide mouth through which two side by side downspouts can be inserted.

24. The feeder unit according to claim 21 wherein the feed dispensing control system comprises an elongate shelf which extends substantially along a full length of the trough and provides a substantially horizontal surface for receiving feed, said horizontal surface of said shelf being arranged at a height above and rearwardly of said front edge and separate from said trough such that any feed falling therefrom along the full length thereof can fall directly vertically downwardly into the trough and so as to allow access by the head of the animal to said shelf for direct feeding therefrom, and between said shelf and said front edge to said base.

* * * * *